March 27, 1934.  S. LUCEY  1,952,876
SHIELD FOR GEAR SHIFT LEVERS
Filed Dec. 30, 1932
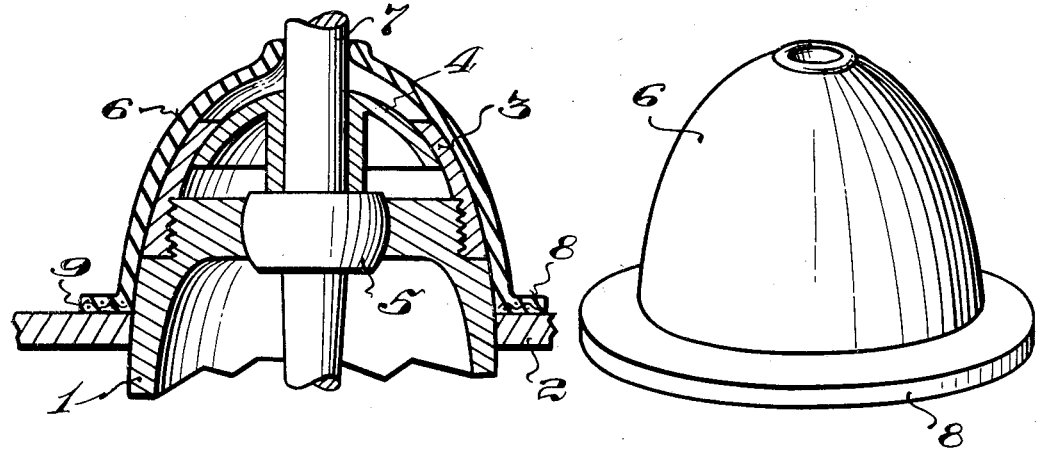
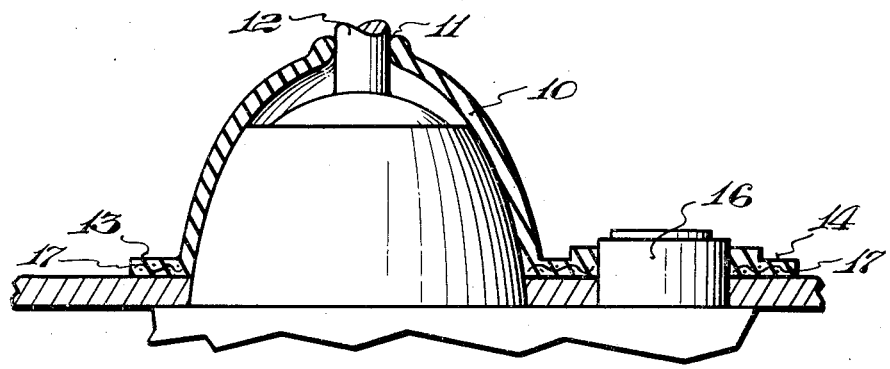
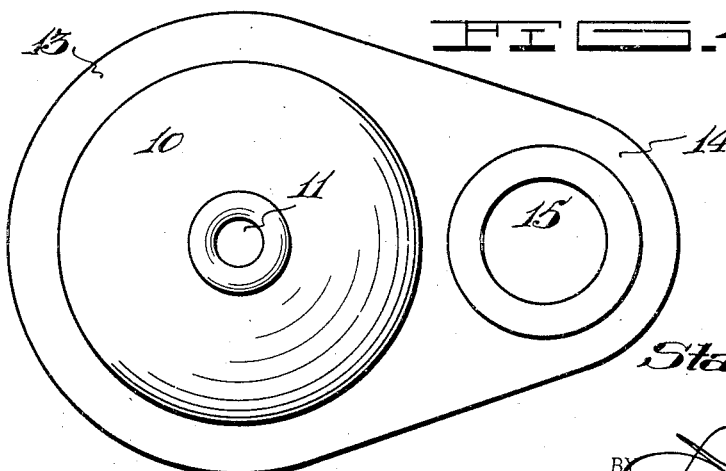
Stannie Lucey
INVENTOR.
ATTORNEY.

Patented Mar. 27, 1934

1,952,876

UNITED STATES PATENT OFFICE 1,952,876

SHIELD FOR GEAR SHIFT LEVERS

Stannie Lucey, Cleburne, Tex.

Application December 30, 1932, Serial No. 649,521

1 Claim. (Cl. 180—90.6)

This invention relates to automobiles and it has particular reference to a shield so constructed and arranged as to conformably fit over the joint of the gear shift lever of said automobile.

The principal object of the invention is to provide a means for the protection of shoes, hose and other wearing apparel of the occupants of the vehicle against grease, oil and accumulations of foreign matter on the conventional cover usually provided adjacent the floor board to conceal the mechanism of the gear shift joint.

Another object of the invention is to provide, as a new article of manufacture, a cover or shield of the character specified which may be applied by slipping the same over the upper end of the gear shift lever and sliding it down into position to cover the conventional housing and which will not only prevent grease and oil from emerging from the housing but will also function to prevent the attraction of dust and the like which may soil the shoes and other wearing apparel.

With the foregoing objects as paramount, the invention has particular reference to its salient features of construction and arrangement of parts which will become manifest as the description proceeds, taken in connection with the accompanying drawing, wherein:—

Figure 1 is a sectional view through the gear shift lever joint and housing, showing the relationship of the invention therewith.

Figure 2 is a perspective view of the exterior of the invention.

Figure 3 is a slightly modified form, showing the application of the invention to a gear shift with an attendant transmission lock, and Figure 4 is a plan view of the device shown in Figure 3.

Continuing with a more detailed description of the drawing, 1 designates a part of the transmission housing, which extends through an opening in the floor board 2 of the vehicle and is threaded to receive the conventional cap or housing 3, which embraces the joint 4 and ball 5.

An objectionable feature of practically all the gear shift joints now in common use is that while most of them have close fitting parts, they are not effective in preventing oil and grease from passing upward and accumulating on the outside of the housing to attract dust and dirt to soil the shoes and other wearing apparel of the passengers of the vehicle.

The invention provides a shield 6, preferably of some character of resilient material and so shaped as to conform to the housing which conceals the gear shift joint. It is also preferred that this shield be so constucted that the opening in its top may receive the gear shift lever 7 so that it may be applied by removing the ball from the lever 7 and passing downwardly to conformably cover the housing 3.

The shield 6 has a skirt or flange portion 8, preferably reinforced by suitable fabric 9 and which flange or skirt portion may lie flush against the floor board 2 and the carpet or rug may cover this flange to present a neat appearance.

The modified form of the device shown in Figures 3 and 4 is substantially the same as the structure just described and is comprised of the bell shaped shield 10 having an opening 11 in its top to receive the gear shift lever 12 in the same manner as in the foregoing and the skirt or flange portion 13 is so shaped as to provide an extension 14 at one side of the shield 10 and which extension is provided with an opening 15 to receive an attendant transmission lock 16, in the manner shown in Figure 3. The skirt portion 13 and extension 14 are preferably reinforced by some suitable material 17.

The foregoing describes the preferred embodiment of the invention as well as the preferred material of which the same is constructed but it is understood that slight modification may be made both as to construction and material to adapt the invention to any type of gear shift joint, whether it be of the type shown in the drawing or so long as such modifications are considered within the spirit and intent of the invention as set forth in the following claim therefor.

What is claimed is:

As a new article of manufacture, a device for embracing the joint of an automobile gear shift lever to protect the wearing apparel against accumulations of grease and the like thereon, comprising in combination a bell shaped flexible body shaped to conformably receive said gear shift lever joint and having an opening to receive said gear shift lever, an annular reinforcing rib integral with said flexible body and surrounding said opening, an outwardly extending skirt portion integral with said flexible body and arranged to lie flush upon the floor board of said automobile and having a beaded opening therein, and an annular ring of flexible reinforcing fabric molded within the said skirt portion of said flexible body.

STANNIE LUCEY.